No. 689,037. Patented Dec. 17, 1901.
H. A. CALLON.
SURFACE CONDENSER.
(Application filed Feb. 28, 1901.)
(No Model.)

Witnesses
Wm. O. Morck
J. F. Matson

Inventor
Harry A. Callon
By Thompson & Bell
Attorney.

UNITED STATES PATENT OFFICE.

HARRY A. CALLON, OF INDIANAPOLIS, INDIANA, ASSIGNOR OF ONE-HALF TO KNIGHT AND JILLSON COMPANY, OF INDIANAPOLIS, INDIANA, A CORPORATION OF INDIANA.

SURFACE CONDENSER.

SPECIFICATION forming part of Letters Patent No. 689,037, dated December 17, 1901.

Application filed February 23, 1901. Serial No. 48,465. (No model.)

*To all whom it may concern:*

Be it known that I, HARRY A. CALLON, a citizen of the United States, residing at Indianapolis, in the county of Marion and State of Indiana, have invented new and useful Improvements in Surface Condensers, of which the following is a specification.

My invention relates to certain new and useful improvements in surface condensers, hereinafter fully described, and particularly pointed out in the claims.

The object of my invention is to provide a means of connecting the ends of the tubes of surface condensers to their headers so as to be removable independently of each other and also be capable of being disconnected singly without disconnecting any of the other tubes; also, to provide a yielding means of connecting said pipes or tubes to said headers, whereby said pipes or tubes will be permitted to freely expand or contract in a longitudinal direction when subjected to variations of temperature or subjected to unequal temperatures; also, to provide means whereby the cooling-surface of the tubes of the condenser will not only be increased, but rendered more effective. I attain these objects by means of the apparatus illustrated in the accompanying drawings, in which similar numerals of reference designate like parts throughout the several views.

Figure 1:
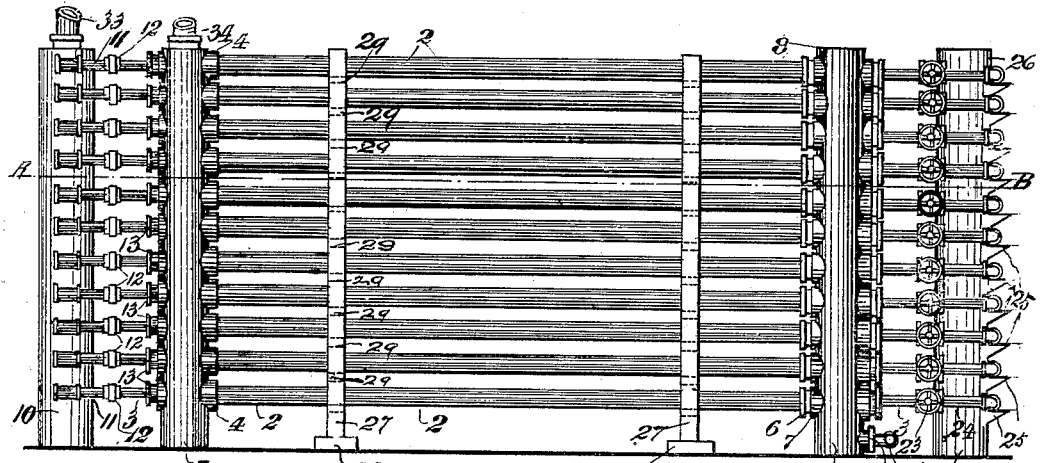
Figure 2:
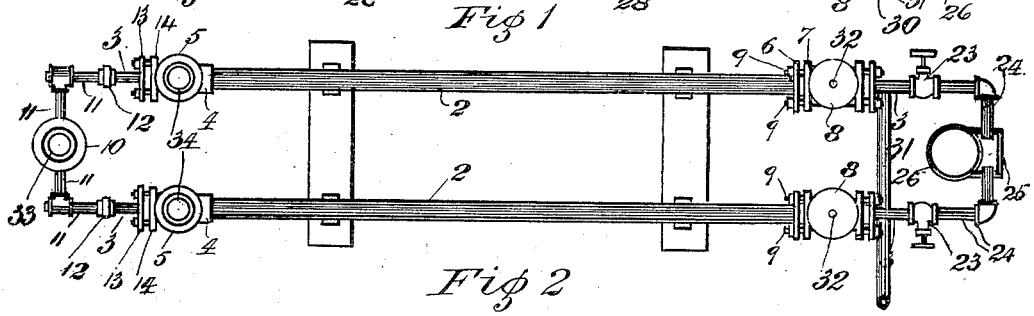
Figure 3:
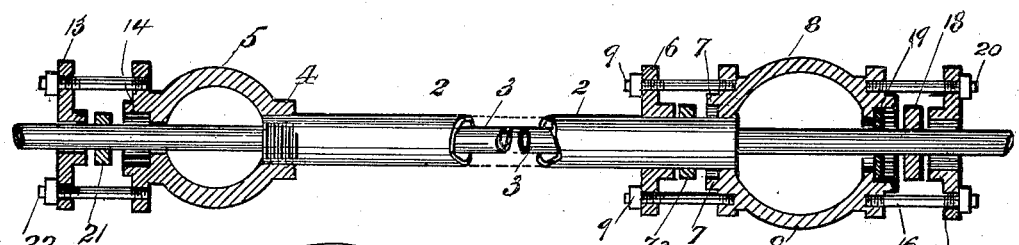
Figure 5:
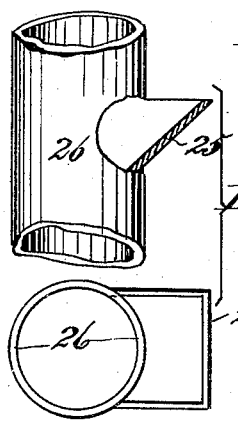
Figure 4:
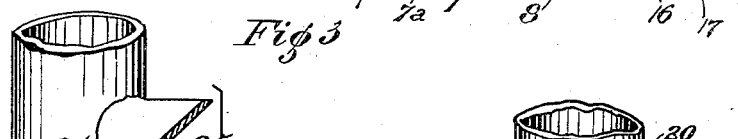

Figure 1 is an elevational side view of the apparatus. Fig. 2 is a plan view of the same. Fig. 3 is an enlarged detail broken-off sectional plan view of the headers and the connecting-tubes thereof and taken through the line A B. (See Fig. 1.) Fig. 4 is an enlarged broken-off detail view of a portion of a header, showing the packing-gland of the tube thereof; and Fig. 5 shows enlarged broken-off plan and elevational views of the down-spout for carrying off the waste or circulating water.

The condenser consists of a series of pipes or tubes 2, which inclose and surround the internal tubes 3 to form a fluid-circulating space between them, and by this means a space of contracted area is obtained, through which the fluid to be cooled or condensed is circulated rapidly, thereby increasing the efficiency of the cooling-surfaces of the exterior tubes and the interior cooling-tubes. The exterior tubes 2 are either securely expanded or screwed into the bosses 4, formed integral on the distributing stand-pipes or headers 5, to form a steam-tight joint therewith, and the opposite ends of said exterior tubes extend through the glands 6 and the stuffing or packing boxes 7 of the receiving stand-pipes or headers 8 to form yielding or expanding joints thereat, and thereby permit the free and independent extension or contraction of the said tubes 2 in said yielding joints. The glands 6 are drawn up into their packing-boxes 7 by their gland-bolts 9 to compress the packing-rings 7ª, preferably of rubber or other suitable elastic substance, therein and around the said tube 2 to form a steam-tight joint, which form of joint permits the tube to freely expand or contract longitudinally.

The water-distributing stand-pipe or header 10 is provided with the distributing branch pipes 11, which are connected to and extend outwardly from the opposite sides thereof and are either bent to a right angle or provided with suitable elbow-fittings to be connected to the ends of the interior cooling-tubes 3 by suitable removable couplings or unions 12. The latter fittings may be of any of the well-known forms of unions or couplings and need no special description. The interior cooling-tubes 3 extend from the said couplings through the glands 13 and the stuffing or packing boxes 14 of the stand-pipes or headers 5 and centrally through the outer tubes 2, thence through the stand-pipes or receiving-headers 8, and finally through the stuffing or packing boxes 16 and their glands 17, through which they project to a suitable extent. The packing-boxes 16 are of a diameter somewhat larger than that of the exterior diameter of the exterior tubes 2 to permit the latter to be disconnected from their headers 5 and are moved longitudinally through said packing-boxes and glands when such removal is necessary—as, for instance, in such cases as when old or imperfect tubes have to be removed, and these are to be replaced by new or perfect tubes—which operation can be readily performed without disconnecting or breaking the joints of the adjacent tubes.

In order that the free ends of the interior cooling-tubes 3 may be properly supported in the packing-boxes 16 and the clearance-space between the smaller tube 3 be closed against the packing-ring 18, also preferably of rubber, I provide the distance or supporting washers 19, which are drilled to loosely receive the smaller tube 3, and said distance-washers are of a diameter to permit their free entrance into said packing-boxes 16. The distance-washers 19 are first slipped over the free ends of the cooling-tubes 3 and moved into the packing-boxes 16. The packing-rings 18 are next applied, and finally the packing-glands 17 are drawn into the packing-boxes 16 by their gland-bolts 20 to expand said elastic packing-rings 18 over said cooling-tubes 3 to form a yielding steam-tight joint.

The packing-boxes 14 of the stand-pipes or distributing-headers 5 are bored to loosely receive the smaller or cooling tubes 3, and packing-rings 21, similar to those of 18 and 7ª, are used, and the glands 13 loosely fit on said tubes and are drawn into their packing-boxes 14 by the gland-bolts 22 in the same manner as previously described. Each of the projecting ends of the cooling-tubes 3 is provided with stop or regulating valves 23, by means of which the flow or discharge of the cooling or circulating water or fluid may be regulated, and to each of the said valves 23 are connected the drip-pipes 24, which have their discharge ends directed toward the drip-spouts 25 of the waste downtake-pipe 26, by which latter the waste or discharged circulating or cooling fluid is conveyed to a suitable reservoir or other receptacle.

Suitable standards 27, secured to the bases 28 and having suitable cross-bars 29 arranged at intervals apart to contact with the bottom sides of each of the tubes 2, are provided for the purpose of forming intermediate supporting-bearings for said tubes when the latter are long and not capable of supporting their own weight without sagging.

The receiving-headers 8 are provided with suitable bottom drain-necks 30, to which may be connected any suitable conveying-pipe 31, by which the condensed fluid is conveyed and discharged into a suitable receptacle to be stored therein, and on the tops of said receiving stand-pipes or headers 8 are the vent-openings 32, which are provided for the purpose of permitting the free escape of the gases and air that accumulate in said headers 8 during the operation of the apparatus.

The operation of the apparatus is as follows: Circulating water, which may be obtained from any available source, is admitted into the water-distributing pipe or header 10 by means of the water-supply pipe 33 and is distributed therefrom through its branch pipes 11 into and through the cooling-pipes 3 of each of the tiers simultaneously. The valves 23 are now open to permit the free flow of the circulating water through them, which amount of flow is controlled and regulated by said valves to suit the conditions due to temperature and the required capacity of the apparatus. The steam or other fluid to be cooled or condensed is conveyed by the pipe 34 and discharged into the distributing stand-pipe or headers 5, from each of which headers said fluid is equally distributed and discharged into the tubes 2 and around the cooling-tubes 3, inclosed therein, in which spaces cooling and condensation of the fluid takes place. The fluid thus condensed or cooled is discharged from said tubes 2 into the receiving-headers or stand-pipes 8, from which the fluid is conveyed by the conveyer-pipes 31 to a suitable receptacle to be stored therein for future use.

This apparatus may be composed of one, two, or more rows or tiers of tubes connected at their ends in the manner and by the means hereinbefore described; but I prefer to use two rows or tiers of tubes, as shown in the drawings, in connection with each apparatus, and when necessary to increase the capacity of the apparatus add to the lengths of the tubes rather than increasing the number of rows or tiers of tubes.

Having thus fully described my invention, what I claim as new and useful, and desire to cover by Letters Patent of the United States therefor, is—

1. In a surface condenser, the combination with a distributing-header, and a receiving-header, of an exterior tube arranged between said headers and connected thereto, an interior cooling-tube passing through said exterior tube, one of said headers being provided with oppositely-disposed alined openings into one of which said tubes fit, the other opening being adapted to facilitate removal of said tubes from the headers, and means for closing said latter opening.

2. In a surface condenser, the combination with a distributing-header, and a receiving-header, of an exterior tube arranged between said headers and rigidly but removably connected to one of the same, an interior cooling-tube passing through said exterior tube, the other of said headers being provided with oppositely-disposed alined openings into one of which said tubes fit, the other opening being adapted to facilitate removal of said tubes from the headers, and means for closing said latter opening.

3. In a surface condenser, the combination with a distributing-header, and a receiving-header, of an exterior tube arranged between said headers and connected to one of the same, an interior cooling-tube passing through said exterior tube, the other of said headers being provided with oppositely-disposed alined openings into one of which said tubes fit, the other opening being adapted to facilitate removal of said tubes from the headers, packing-boxes arranged around said openings, and glands coöperating with said boxes to close the same.

4. In a surface condenser, the combination with a distributing-header, and a receiving-header, of an exterior tube arranged between said headers and rigidly but removably connected to one of the same, an interior cooling-tube passing through said exterior tube, the other of said headers being provided with oppositely-disposed alined openings into one of which said tubes fit, the cooling-tube also passing through the other of said openings, said latter opening being adapted to facilitate removal of said tubes from the headers, packing-boxes arranged around said openings, and glands coöperating with the boxes and tubes to close said openings and to form a yielding connection between the tubes and the header.

5. In a surface condenser, the combination with a distributing-header, and a receiving-header, of an exterior tube arranged between said headers, an interior cooling-tube passing through said exterior tube and having its ends projecting beyond the headers but yieldingly connected to the latter to permit expansion and contraction, one of said headers being provided with oppositely-disposed alined openings into one of which said tubes fit, the other opening being adapted to facilitate removal of said tubes from the headers, and means for closing said latter opening.

6. In a surface condenser, the combination with a distributing-header for the fluid to be condensed, a receiving-header for such fluid, and a tube arranged between said headers, of a distributing-header for the condensing agent, a cooling-tube removably connected at one end thereto and passing through the first-mentioned distributing-header, the first-mentioned tube, and the receiving-header, the receiving-header being provided with oppositely-disposed alined openings into one of which said tubes fit, the other opening being adapted to facilitate removal of said tubes from the headers, and means for closing said latter opening.

7. In a surface condenser, the combination with a distributing-header for the fluid to be condensed, a receiving-header for such fluid, and a tube arranged between said headers, said tube being rigidly but removably connected to the distributing-header and yieldingly connected to the receiving-header, of a distributing-header for the condensing agent, a cooling-tube removably connected at one end thereto and passing through the first-mentioned header, the first-mentioned tube, and the receiving-header and yieldingly connected to said headers to permit expansion and contraction, the receiving-header being provided with oppositely-disposed alined openings into one of which said tubes fit, the other opening being adapted to facilitate removal of said tubes from the headers, and means for closing said latter opening.

8. In a surface condenser, the combination with a distributing-header for the fluid to be condensed, a receiving-header for such fluid, and a tube arranged between said headers, said tube being rigidly but removably connected to the distributing-header and yieldingly connected to the receiving-header, of a distributing-header for the condensing agent, a cooling-tube removably connected at one end thereto and passing through the first-mentioned header, the first-mentioned tube, and the receiving-header and yieldingly connected to said headers to permit expansion and contraction, said cooling-tube having a valve for regulating the flow of the condensing agent therethrough, the receiving-header being provided with oppositely-disposed alined openings into one of which said tubes fit, the other opening being adapted to facilitate removal of said tubes from the headers, and means for closing said latter opening.

9. In a surface condenser, the combination with a distributing-header for the fluid to be condensed, a receiving-header for such fluid, and a series of tubes arranged between said headers, said tubes being rigidly but removably connected to the distributing-header and yieldingly connected to the receiving-header, of a distributing-header for the condensing agent, a series of cooling-tubes removably connected at one end thereto and passing through the first-mentioned header, the first-mentioned tubes, and the receiving-header and yieldingly connected to said headers to permit expansion and contraction, the receiving-header being provided with oppositely-disposed alined sets of openings into one set of which said tubes fit, the other set of said openings being adapted to facilitate removal of the tubes from the headers, means for closing said openings, and a waste-pipe common to all of the cooling-tubes and into which such tubes discharge.

In testimony whereof I have hereunto set my hand in the presence of two subscribing witnesses.

HARRY A. CALLON.

Witnesses:
THOMPSON R. BELL,
WILMER W. CRITCHLOW.